US009399397B2

(12) United States Patent
Mizutani et al.

(10) Patent No.: US 9,399,397 B2
(45) Date of Patent: Jul. 26, 2016

(54) CRUISE CONTROL APPARATUS

(71) Applicant: DENSO CORPORATION, Kariya, Aichi-pref. (JP)

(72) Inventors: Akiyoshi Mizutani, Nagoya (JP); Keiji Matsuoka, Nagoya (JP); Koji Shimizu, Ichinomiya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 88 days.

(21) Appl. No.: 13/761,548

(22) Filed: Feb. 7, 2013

(65) Prior Publication Data

US 2013/0211689 A1  Aug. 15, 2013

(30) Foreign Application Priority Data

Feb. 13, 2012  (JP) .................................. 2012-028519

(51) Int. Cl.
*B60K 31/00* (2006.01)
*B60W 30/16* (2012.01)

(52) U.S. Cl.
CPC ................ *B60K 31/00* (2013.01); *B60W 30/16* (2013.01); *B60W 2420/42* (2013.01); *B60W 2420/52* (2013.01)

(58) Field of Classification Search
None
See application file for complete search history.

(56) References Cited

U.S. PATENT DOCUMENTS

| 5,612,699 | A | * | 3/1997 | Yamada | G01S 7/412 342/70 |
| 5,710,565 | A | | 1/1998 | Shirai et al. | |
| 6,340,935 | B1 | * | 1/2002 | Hall | 340/932.2 |
| 6,941,216 | B2 | * | 9/2005 | Isogai et al. | 701/96 |
| 2002/0016663 | A1 | * | 2/2002 | Nakamura et al. | 701/96 |
| 2003/0218564 | A1 | | 11/2003 | Tamatsu et al. | |
| 2005/0251313 | A1 | * | 11/2005 | Heinrichs-Bartscher | 701/41 |
| 2005/0251323 | A1 | * | 11/2005 | Heinrichs-Bartscher | 701/117 |
| 2009/0055095 | A1 | * | 2/2009 | Urban et al. | 701/301 |
| 2009/0212930 | A1 | * | 8/2009 | Pfeiffer et al. | 340/435 |
| 2010/0256835 | A1 | * | 10/2010 | Mudalige | 701/2 |
| 2010/0256836 | A1 | * | 10/2010 | Mudalige | 701/2 |
| 2010/0256852 | A1 | * | 10/2010 | Mudalige | 701/24 |

(Continued)

FOREIGN PATENT DOCUMENTS

| JP | 08-279099 | 10/1996 |
| JP | 2002-207077 | 7/2002 |
| JP | 2002-303668 | 10/2002 |
| JP | 2003-344534 | 12/2003 |

OTHER PUBLICATIONS

Office Action issued Jan. 7, 2014 in corresponding JP Application No. 2012-028519 (with English translation).

*Primary Examiner* — Rami Khatib
*Assistant Examiner* — Navid Ziaeianmehdizadeh
(74) *Attorney, Agent, or Firm* — Harness, Dickey & Pierce, P.L.C.

(57) ABSTRACT

The cruise control apparatus includes a headway control means for making a first determination as to whether or not at least one recognized front vehicle running ahead of an own vehicle is a preceding vehicle present in an own-vehicle lane in which the own vehicle is running, performing a headway control to cause the own vehicle to run following the preceding vehicle when the first determination is affirmative, and a vehicle type recognizing means for recognizing a type of the recognized front vehicle. The headway control means is configured to change a way to perform the headway control depending on the type (vehicle size, for example) of the recognized front vehicle.

2 Claims, 4 Drawing Sheets

(56) References Cited

U.S. PATENT DOCUMENTS

2012/0176234 A1* 7/2012 Taneyhill et al. ............ 340/453
2013/0054106 A1* 2/2013 Schmudderich et al. ....... 701/96
2013/0158830 A1* 6/2013 Kurumisawa et al. .......... 701/96
2013/0179379 A1* 7/2013 Kurumisawa et al. .......... 706/46

* cited by examiner

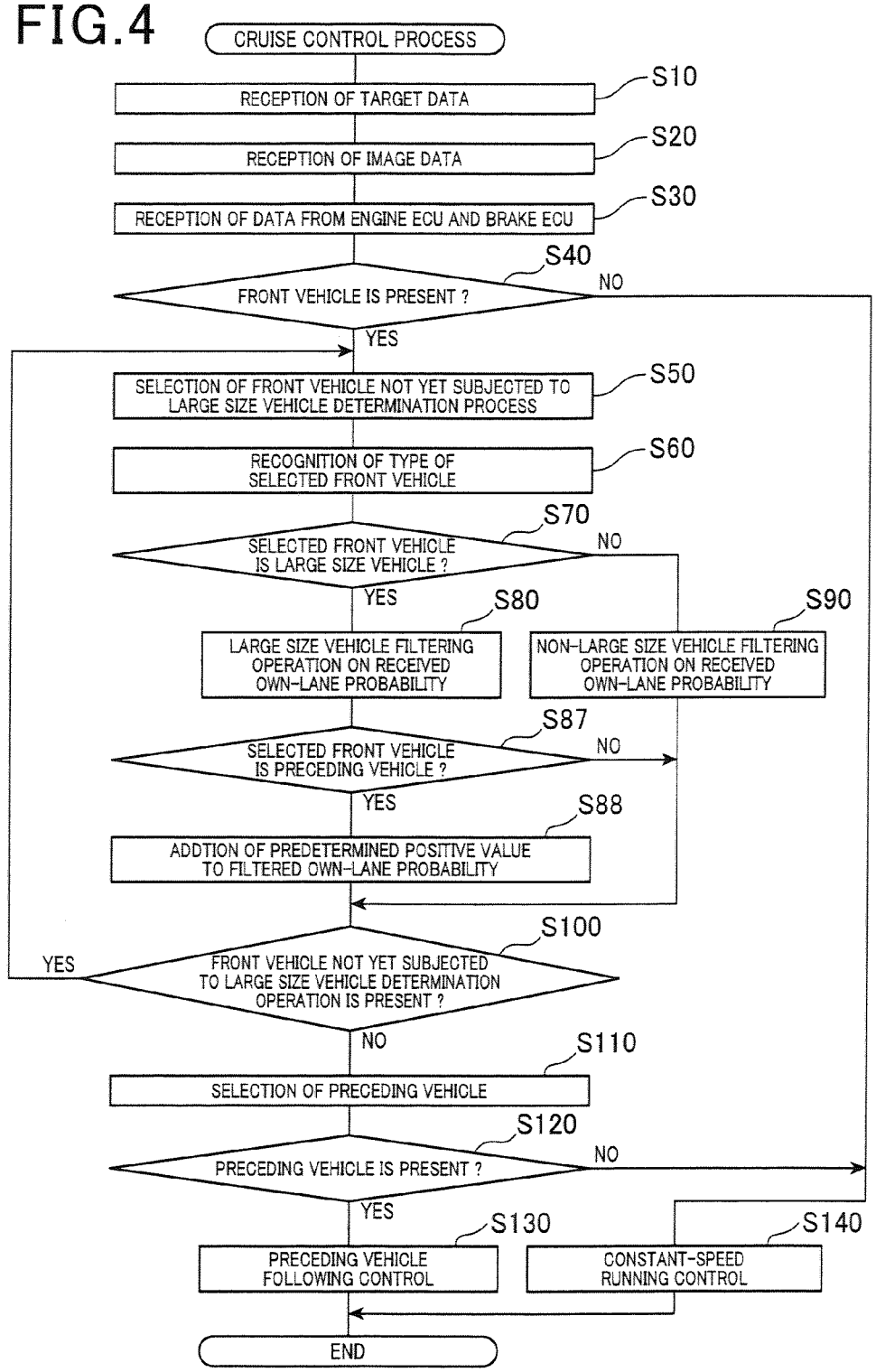

CRUISE CONTROL APPARATUS

This application claims priority to Japanese Patent Application No. 2012-28519 filed on Feb. 13, 2012, the entire contents of which are hereby incorporated by reference.

BACKGROUND OF THE INVENTION

1. Field of the Invention

The present invention relates to a cruise control apparatus having a function to cause an own vehicle (a vehicle equipped with this cruise control apparatus) to run following a preceding vehicle.

2. Description of Related Art

There is known a vehicle-mounted radar apparatus configured to transmit a radar wave (a laser wave or a millimeter wave, for example) and detect an object present around the vehicle based on a reflected version of the radar wave.

Such a vehicle-mounted radar apparatus is used for the so-called auto cruise control which operates to detect a preceding vehicle (a vehicle running ahead in the same lane as the own vehicle), and cause the own vehicle to run keeping constant the following distance to the preceding vehicle.

There is known a technique in which a front vehicle (a vehicle running ahead of an own vehicle) is recognized as a preceding vehicle the following distance to which the own vehicle should keep constant, in accordance with probability that the front vehicle is running in the same lane as the own vehicle (may be referred to as "the own vehicle lane" hereinafter), the probability being calculated based on the curve radius of the lane in which the own vehicle is running and the relative position of the front vehicle. This technique is for preventing a vehicle running under control of the auto cruise control from erroneously recognizing a front vehicle running in a lane different from the own vehicle lane as a preceding vehicle. For example, refer to Japanese Patent Application Laid-open No. H8-279099.

However, the above conventional technique has a problem in that the accuracy of detection of the position of a front vehicle is reduced while the front vehicle makes a turn, because the lateral position (the position in the width direction of the own vehicle) of a point of the front vehicle at which the radar wave reflects (referred to as "the front vehicle reflection point" hereinafter) shifts in the direction of the turn (that is, shifts leftward while the front vehicle makes a left turn, and shifts rightward while the front vehicle makes a right turn). This is because the own vehicle receives the radar wave reflected mainly at the center portion of the back side of the front vehicle when the front vehicle is running straight, receives the radar wave reflected mainly at the left end portion of the back side of the front vehicle when the front vehicle is making a left turn, and receives the radar wave reflected mainly at the right end portion of the back side of the front vehicle when the front vehicle is making a right turn.

Particularly, when the front vehicle is a large size vehicle such as a truck, since the distance between the center portion and the left or right end portion is large, reduction of the accuracy of detection of the position of the front vehicle increases.

SUMMARY

An exemplary embodiment provides a cruise control apparatus including:

a headway control means for making a first determination as to whether or not at least one recognized front vehicle running ahead of an own vehicle is a preceding vehicle present in an own-vehicle lane in which the own vehicle is running, performing a headway control to cause the own vehicle to run following the preceding vehicle when the first determination is affirmative; and a vehicle type recognizing means for recognizing a type of the recognized front vehicle, wherein the headway control means is configured to change a way to perform the headway control depending on the type of the recognized front vehicle.

According to the exemplary embodiment, there is provided a cruise control apparatus which enables performing cruise control appropriately depending on the type of a recognized front vehicle running ahead of the own vehicle.

Other advantages and features of the invention will become apparent from the following description including the drawings and claims.

BRIEF DESCRIPTION OF THE DRAWINGS

In the accompanying drawings:

FIG. 4 is a flowchart showing steps of a cruise control process performed by a cruise control apparatus according to a third embodiment of the invention.

PREFERRED EMBODIMENTS OF THE INVENTION

First Embodiment

Figure 1:
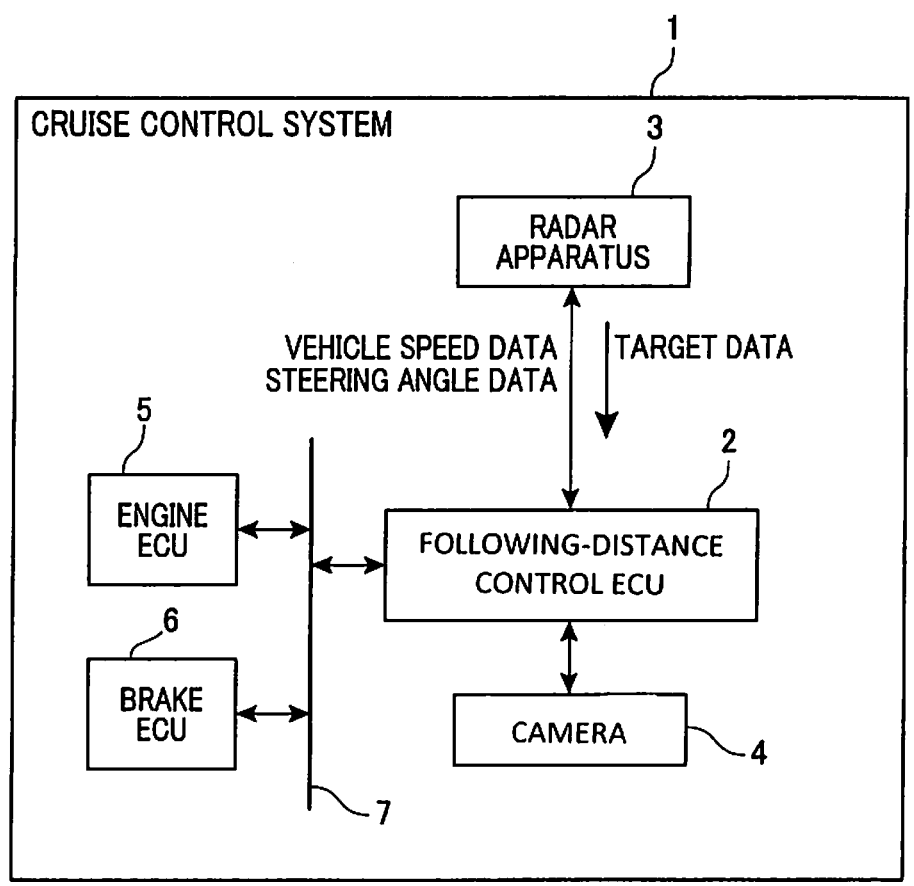
FIG. 1 is a block diagram schematically showing the structure of a cruise control system including a cruise control apparatus according to a first embodiment of the invention.

FIG. 1 is a block diagram schematically showing the structure of a cruise control system 1 including a cruise control apparatus according to a first embodiment of the invention. This cruise control system 1 is mounted on a vehicle (may be referred to as the own vehicle hereinafter).

As shown in FIG. 1, the cruise control system 1 includes a following-distance control electronic control unit (referred to as the following-distance control ECU hereinafter) 2, a radar apparatus 3, a camera 4, an engine electronic control unit (referred to as the engine ECU hereinafter) 5, a brake electronic control unit (referred to as the brake ECU hereinafter) 6. The ECUs 2, 5 and 6 are connected to one another through an in-vehicle LAN 7 so that each of them can transmit and receive various data to and from the other ECUs.

The engine ECU 5 transmits, to the following-distance control unit ECU 2, data representing a vehicle speed, an engine control state and an accelerator operation state measured respectively by not-shown vehicle speed sensor, throttle opening degree sensor and accelerator pedal opening degree sensor. Also, the engine ECU 5 receives data representing a target acceleration, a fuel cut request and so forth from the following-distance control unit ECU 2, and outputs a drive command to a throttle actuator or the like for adjusting the throttle opening degree of the internal combustion engine of the vehicle in accordance with the vehicle running state determined from the received data.

The brake ECU 6 transmits, to the following-distance ECU 2, data representing the brake pedal state determined from the steering angle and the yaw rate of the vehicle respectively measured by not-shown steering angle sensor and yaw rate sensor, and the M/C pressure (master cylinder pressure) measured by a not-shown M/C pressure sensor. Also, the brake ECU 6 receives data representing a target acceleration, a brake request and so on from the following-distance control ECU 2, and controls braking force by driving a brake actuator for opening and closing a booster valve and a reducing valve provided in a brake hydraulic circuit.

The radar apparatus 30, which is the so-called millimeter wave radar of the FMCW type, recognizes a front vehicle (a vehicle running ahead of the own vehicle) by transmitting and receiving a frequency-modulated radar wave in the millimeter wave band. The radar apparatus 3 has a function to calculate the probability that the recognized front vehicle is present in the same lane as the own vehicle (this probability being referred to as "the own-lane probability" hereinafter) based on the vehicle speed data and steering angle data as data representing a curve curvature radius R received from the following-distance control ECU 2, and the position of the recognized front vehicle. The radar apparatus 3 generates target data regarding the front vehicle and transmits it to the following-distance control ECU 2.

The target data includes at least the relative speed, position and own-lane probability of the front vehicle.

The camera 4 takes an image ahead of the own vehicle, and transmits image data representing the taken image to the following-distance control ECU 2. The following-distance control ECU 2 receives data representing the vehicle speed and engine control state from the engine ECU 5, and receives data representing the steering angle, yaw rate and brake control state from the brake ECU 6. The following-distance control ECU 2 generates a control command used for keeping the following distance, that is, the distance to a front vehicle running in the same lane as the own vehicle (referred to as the preceding vehicle hereinafter) at an appropriate distance based on set values set by not-shown cruise control switch and target following-distance setting switch, and the target data received from the radar apparatus 3. The following-distance control ECU 2 transmits the control command including a target acceleration and a fuel cut request to the engine ECU 5. Also, the following-distance control ECU 2 transmits the control command including the target acceleration and a braking request to the brake ECU 6.

Figure 2:
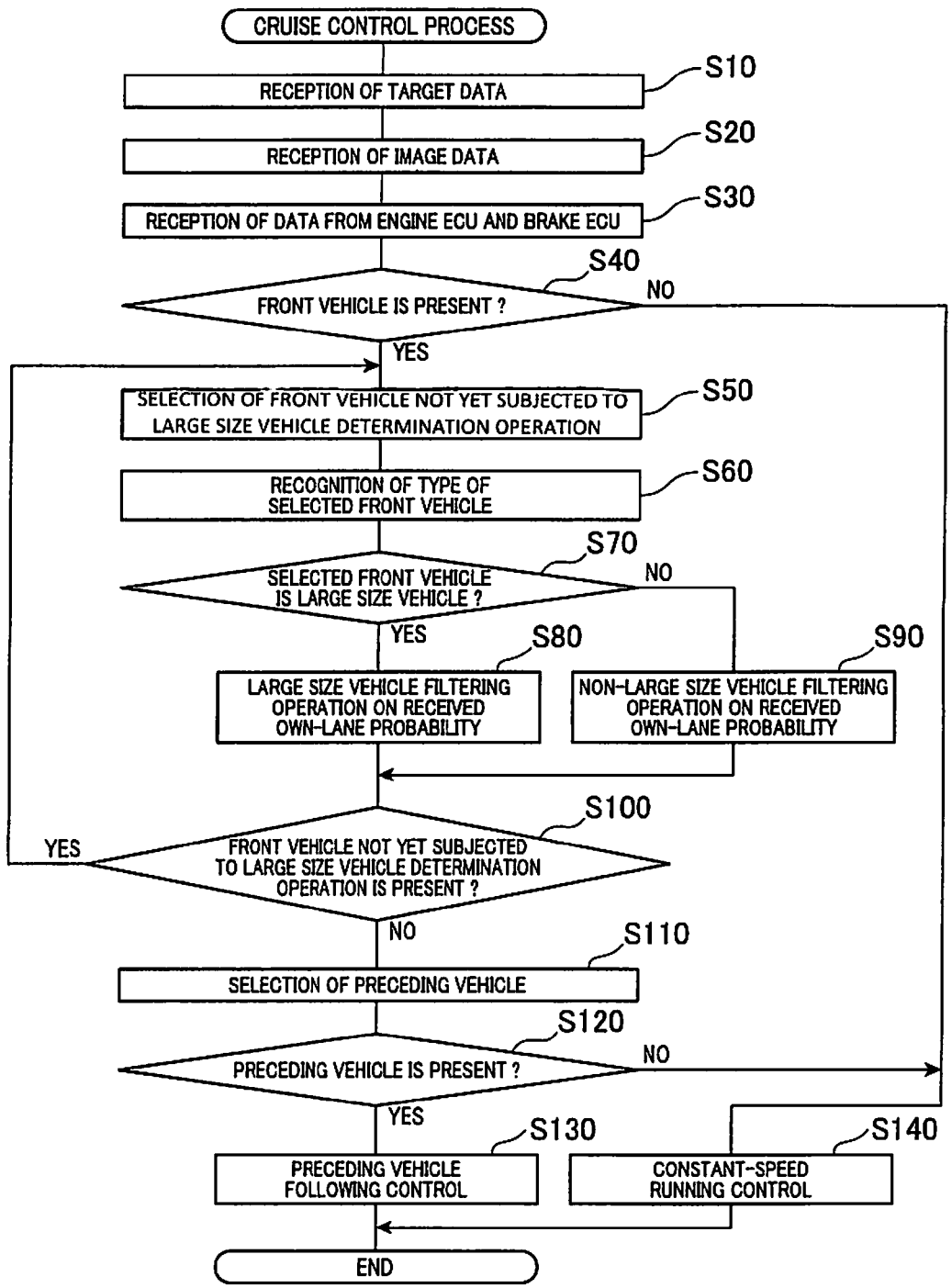
FIG. 2 is a flowchart showing steps of a cruise control process performed by the cruise control apparatus according to the first embodiment of the invention.

Next, a cruise control process performed by the following-distance control ECU 2 is explained with reference to the flowchart of FIG. 2. The cruise control process is performed repeatedly while the cruise control switch is on.

This process begins in step S10 where the following-distance control ECU 2 receives the target data from the radar apparatus 3. In subsequent step S20, the following-distance control ECU 2 receives image data representing images ahead of the own vehicle from the camera 4. Further, in step S30, the following-distance control ECU 2 receives the various data from the engine ECU 5 and the brake ECU 6, the various data including
the vehicle speed, engine control state, steering angle, yaw rate and brake control state.

Thereafter, it is determined in step S40 whether or not there is at least one front vehicle based on the target data received in step S10. The process proceeds to step S50 if the determination result in step S40 is affirmative, and otherwise proceeds to step S140. In step S50, there is selected the front vehicle or one of the front vehicles recognized in step S10, on which a large size vehicle determination operation has not been performed yet in a later-explained step S70.

In subsequent step S60, the shape of the front vehicle selected in step S50 is recognized by processing the image data received in step S20, and the vehicle type of the selected front vehicle is recognized by comparison between the recognized shape and model patterns stored in advance.

Subsequently, it is determined whether or not the selected front vehicle is a large size vehicle in step S70. If the determination result in step S70 is affirmative, the process proceeds to step S80 where a large size vehicle filtering operation is performed on the own-lane probability (may be referred to as "the received own-lane probability" hereinafter) of the front vehicle selected in step S50 included in the target data received in step S10, and then proceeds to step S100. The large size vehicle filtering operation is for changing the received own-lane probability so that it deviates more slowly from the own-lane probability obtained by the filtering operation performed at the previous time (may be referred to as "the previous filtered own-lane probability" hereinafter). More specifically, when the previous filtered own-lane probability is A, the received own-lane probability is B, the filtered own-lane probability (the present filtered own-lane probability) is calculated to be $A+(B-A)\cdot k1$, where k1 is a predetermined large size vehicle filtering value (0.5 in this embodiment).

On the other hand, if the determination result in step S70 is negative, the process proceeds to step S90 where a non-large size vehicle filtering operation is performed on the own-vehicle lane probability (the received own-lane probability) of the front vehicle selected in step S50 included in the target data received in step S10, and then proceeds to step S100. The non-large size vehicle filtering operation is for changing the received own-lane probability so that it deviates more slowly from the previous filtered own-lane probability using a non-large size vehicle filtering value k2 larger than the large size vehicle filtering value k1. More specifically, when the previous filtered own-lane probability is A, the received own-lane probability is B, the filtered own-lane probability (the present filtered own-lane probability) is calculated to be $A+(B-A)\cdot k2$, where k2 is the non-large size vehicle filtering value (0.8 in this embodiment). The difference between the received own-lane probability and the present filtered own-lane probability obtained by performing the non-large size vehicle filtering operation is smaller than that obtained by performing the large size vehicle filtering operation.

In step S100, it is determined whether or not there is still a front vehicle which has been recognized based on the target data received in step S10, but which has not yet been subjected to the operation in step S70. If the determination result in step S100 is affirmative, the process returns to step S50 to repeat the above operations. On the other hand, if the determination result in step S100 is negative, the process proceeds to step S110 where, of the front vehicles recognized based on the target data received in step S10, the one which is in the same lane as the own vehicle and satisfies a predetermined preceding vehicle-selecting condition is selected as a preceding vehicle. In this embodiment, the preceding vehicle-selecting condition is that the present filtered own-lane probability is the largest of the recognized front vehicles, and is larger than a predetermined preceding vehicle-determination threshold probability.

Thereafter, it is determined in step S120 whether a preceding vehicle has been selected in step S110. If the determination result in step S120 is affirmative, the process proceeds to step S130 to perform preceding vehicle-following control where a control command for adjusting the following distance to the preceding vehicle at an appropriate distance is transmitted to the engine ECU 5 and the brake ECU 6. Then the cruise control process is terminated temporarily. On the other hand, if the determination result in step S120 is negative, the process proceeds to step S140.

In step S140, there is performed constant-speed running control where a control command for causing the own vehicle to run at a set speed is transmitted to the engine ECU 5 and the brake ECU 6.

According to the cruise control system 1 described above, it is determined whether or not there is a preceding vehicle running ahead of and in the same lane as the own vehicle, and if the determination result is affirmative, the cruise control is performed to cause the own vehicle to run following the preceding vehicle (steps S10 to S130). Further, the way in which the cruise control operates is changed depending on whether the recognized front vehicle is a large size vehicle or not (steps S60 to S90). Accordingly, according to this embodiment, it is possible to perform the cruise control optimally depending on whether or not the recognized front vehicle is a large size vehicle by selecting one of a plurality of different control methods prepared in advance for different vehicle sizes.

Further, this embodiment is configured to calculate the own-lane probability based on the position of a front vehicle, perform the filtering operation so as to reduce the temporal variation of the calculated own-lane probability (steps S80 and S90), and thereafter determine whether there is a preceding vehicle based on the filtered own-lane probability (steps S110 and S120). Further, the filtering operation is performed such that the degree of reduction of the temporal change of the own-lane probability is larger when the front vehicle is determined to be a large size vehicle than when the front vehicle is determined to be not a large size vehicle. Accordingly, the temporal variation of the filtered own-lane probability due to change of the position of the front vehicle is smaller when the front vehicle is a large size vehicle than when the front vehicle is not a large size vehicle. That is, the responsiveness of determination of whether there is a preceding vehicle is lower when the front vehicle is a large size vehicle than when the front vehicle is not a large size vehicle.

For example, the time needed for the filtered own-lane probability to change from below the preceding vehicle-determination threshold probability to above the preceding vehicle-determination threshold probability due to change of the received own-lane probability from below the preceding vehicle-determination threshold probability to above the preceding vehicle-determination threshold probability is longer when the front vehicle is a large size vehicle than when the front vehicle is not a large size vehicle. That is, the timing at which a determination that there is a preceding vehicle is made is later when the front vehicle is a large size vehicle than when the front vehicle is not a large size vehicle.

Accordingly, it is possible to suppress occurrence of a situation where a determination that there is a preceding vehicle is erroneously made when the own-lane probability changes from below the preceding vehicle determination threshold probability to above the preceding vehicle-determination threshold probability and immediately thereafter, changes to below the preceding vehicle determination threshold probability. That is, it is possible to suppress occurrence of a situation where a determination that there is a preceding vehicle is erroneously made although actually there is no such vehicle ahead of the own vehicle. Hence, the above described cruise control can deal with a large size vehicle the position of which relative to the own vehicle varies greatly.

In the above described embodiment the following-distance control ECU 2, the radar apparatus 3 and the camera 4 constitute the cruise control apparatus, the following-distance control ECU 2 and steps S10 to S130 constitute a headway control unit, and the following-distance control ECU 2 and step S60 constitute a vehicle type recognizing unit.

Second Embodiment

Next, a second embodiment of the invention is described with a focus on difference with the first embodiment.

The second embodiment is the same as the first embodiment except for that the target data transmitted from the radar apparatus 3 does not include the own-lane probability, and the cruise control process is modified.

Figure 3:
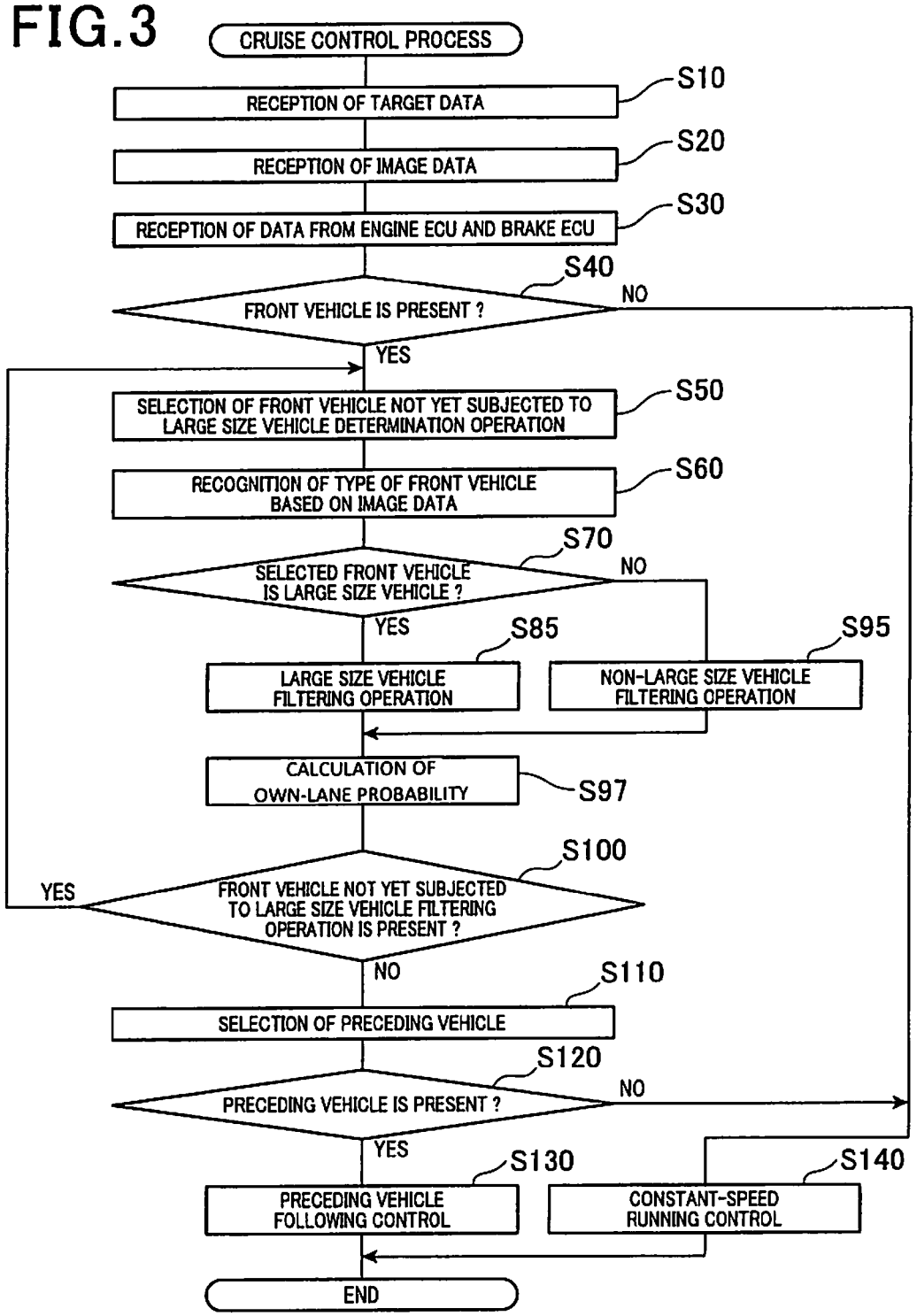
FIG. 3 is a flowchart showing steps of a cruise control process performed by a cruise control apparatus according to a second embodiment of the invention.

The cruise control process performed by the cruise control system 1 according to the second embodiment is explained with reference to the flowchart of FIG. 3. The cruise control process performed in the second embodiment is the same as the cruise control process performed in the first embodiment except for that steps S80 and S90 are eliminated, and steps S85, 95 and 97 are added.

In the second embodiment, if the determination result in step S70 is affirmative, that is, if the recognized front vehicle is a large size vehicle, the lateral position of the front vehicle, that is the position of the front vehicle along the width direction of the own vehicle (referred to as "the front vehicle lateral position" hereinafter) is calculated based on the target data received in step S10, and then the large size vehicle filtering operation is performed on this front vehicle lateral position. Thereafter, the process proceeds to step S97. This filtering operation is for changing the calculated front vehicle lateral position so that it deviates more slowly from the front vehicle lateral position obtained by the filtering operation performed at the previous time (may be referred to as "the previous filtered front vehicle lateral position" hereinafter). More specifically, when the previous filtered front vehicle lateral position is C, the calculated vehicle lateral position is D, the filtered front vehicle lateral position (the present filtered front vehicle lateral position) is calculated to be $C+(D-C)\cdot k3$, where k3 is a predetermined large size vehicle filtering value (0.5 in this embodiment).

On the other hand, if the determination result in step S70 is negative, the process proceeds to step S95 where the lateral position of the front vehicle is calculated based on the position of the of the front vehicle included in the target data received in step S10, and a non-large size vehicle filtering operation is performed on this lateral position (the front vehicle lateral position), and thereafter proceeds to step S97. This non-large size vehicle filtering operation is for changing the calculated front vehicle lateral position so that it deviates more slowly from the previous filtered front vehicle lateral position using the non-large size vehicle filtering value larger than the large size vehicle filtering value.

In step S97, the own-lane probability of the front vehicle is calculated based on the vehicle speed, steering angle and filtered front vehicle lateral position calculated in step S85 or step S95. Thereafter, the process proceeds to step S100.

The cruise control in the second embodiment is such that the filtering operation is performed to reduce the temporal variation of the front vehicle lateral position (steps S85 and S95), and then it is determined whether there is a preceding vehicle based on the filtered front vehicle lateral position (steps S97, S110 and S120). Further, when the front vehicle is determined to be a large size vehicle, the filtering operation is performed such that the degree of reduction of the temporal variation of the front vehicle lateral position is large compared to when the front vehicle is determined to be not a large size vehicle. Accordingly, the temporal variation of the filtered front vehicle lateral position due to change of the calculated front vehicle lateral position is smaller when the front vehicle is a large size vehicle than when the front vehicle is not a large size vehicle. That is, the responsiveness of determination of whether there is a preceding vehicle when the front vehicle is a large size vehicle is lower than when the front vehicle is not a large size vehicle.

Accordingly, it is possible to suppress occurrence of a situation where a determination that there is a preceding vehicle is erroneously made when the front vehicle lateral position changes from below a preceding vehicle determination threshold lateral position to above the preceding vehicle-determination threshold lateral position and immediately thereafter, changes to below the preceding vehicle determination threshold lateral position (that is, when the own-lane probability calculated based on the front vehicle lateral position changes from below the preceding vehicle-determination threshold probability to above the preceding vehicle-determination threshold probability and immediately thereafter, changes to below the preceding vehicle determination threshold probability). That is, it is possible to suppress occurrence of a situation where a determination that there is a preceding vehicle is made erroneously although actually there is no such vehicle ahead of the own vehicle. Hence, the above described cruise control can deal with a large size vehicle the position of which relative to the own vehicle varies greatly.

Third Embodiment

Next, a third embodiment of the invention is described with a focus on difference with the first embodiment.

The third embodiment is the same as the first embodiment except for that the cruise control process is modified.

The cruise control process performed by the cruise control system 1 according to the third embodiment is explained with reference to the flowchart of FIG. 4.

The cruise control process performed in the third embodiment is the same as the cruise control process performed in the first embodiment except for that steps S87 and S88 are added. In the third embodiment, after completion of step S80, the process proceeds to step S87 where it is determined whether or not the front vehicle selected in step S50 is the same as the vehicle selected as a preceding vehicle in step S110 previously performed. If the determination result in step S87 is negative, the process proceeds to step S100. On the other hand, if the determination result in step S87 is affirmative, the process proceeds to step S88 where a large size preceding vehicle probability (a predetermined positive value) is added to the filtered own-lane probability calculated in step S80, and this added value is determined to be the present filtered own-lane probability. Thereafter, the process proceeds to step S100.

The cruise control in the third embodiment operates to calculate the own-lane probability based on the position of the front vehicle, and determine whether or not there is a preceding vehicle based on the own-lane probability (steps S110 and S120). The own-lane probability is calculated higher when the preceding vehicle is determined to be a large size vehicle than when the preceding vehicle is determined to be not a large size vehicle (steps S87 and S88).

According to the third embodiment, when the own-lane probability is higher than a predetermined preceding vehicle-determination threshold probability, and accordingly it is determined that there is a preceding vehicle, the own-lane probability is not likely to fall below the preceding vehicle-determination threshold probability due to change of the position of the preceding vehicle when the preceding vehicle is a large size vehicle compared to when the preceding vehicle is not a large size vehicle. Hence, according to the third embodiment, it is possible to suppress occurrence of a situation where a determination that there is a preceding vehicle is made erroneously although actually there is no such a vehicle ahead of the own vehicle.

It is a matter of course that various modifications can be made to the above described embodiments as described below. The above embodiments are configured to determine presence of a preceding vehicle based on the own-lane probability, changing the filtered own-lane probability or the filtered preceding vehicle lateral position depending on whether the preceding vehicle is a large size vehicle or not.

However, the determination of presence of a preceding vehicle may be made based on a temporal variation of the lateral position (the position along the width direction of the own vehicle) of the front vehicle included in the target data. More specifically, it can be determined that a front vehicle has squeezed in front of the own vehicle if a temporal variation of the lateral position exceeds a predetermined vehicle presence determination threshold variation when the lateral position is deviates more slowly from the lateral center of the own vehicle, and it can be determined that a front vehicle has left the own vehicle lane if the temporal variation of the lateral position exceeds the predetermined vehicle presence determination threshold variation when the lateral position is moving away from the lateral center of the own vehicle.

In this case where squeezing into or leaving the own vehicle lane of a front vehicle is detected, the responsiveness to a temporal variation of the lateral position of a front vehicle may be changed depending on whether the front vehicle is a large size vehicle or not. More specifically, a determination that a font vehicle or a preceding vehicle has squeezed into or left the own vehicle lane may be made at the timing when the variation amount of the lateral position exceeds the vehicle presence determination threshold variation if the front vehicle or preceding vehicle has been determined to be not a large size vehicle, and may be made at the timing when the lateral position has not changed over a predetermined time period in the opposite direction (the direction in which the lateral position is moving away from the lateral center of the own vehicle at the time of detecting the front vehicle squeezing into the own vehicle lane and the direction to approach the lateral center of the own vehicle at the time of detecting the preceding vehicle leaving the own vehicle lane) after the variation amount of the lateral position exceeded the vehicle presence determination threshold variation.

That is, the responsiveness in making determination as to whether or not the front vehicle has squeezed into the own-vehicle lane or the preceding vehicle has left the own-vehicle lane is set lower when the front vehicle or preceding vehicle is determined to be a large size vehicle than when the front vehicle or preceding vehicle is determined to be not a large size vehicle.

The above configuration makes it possible to suppress making an erroneous determination that there is a preceding vehicle when the variation amount of the lateral position in the direction to approach the lateral center of the own vehicle exceeds the vehicle presence determination threshold variation, and immediately thereafter, the lateral position shifts in the opposite direction. That is, the above configuration makes it possible to suppress occurrence of a situation where a determination that there is a preceding vehicle is erroneously made although actually there is no such vehicle ahead of the own vehicle. Hence, the above described cruise control can deal with a large size vehicle the position of which relative to the own vehicle lane varies greatly.

Incidentally, the method of detecting squeezing in of a front vehicle or leaving of a preceding vehicle is not limited to the one that uses a variation amount of the lateral position. In the above embodiments, imaged data ahead of the own vehicle is used to determine whether a front vehicle is a large size vehicle or not. However, the detection result of the radar apparatus 3 may be used to determine whether a front vehicle is a large size vehicle or not. In this case, if the received power of the radar wave reflected by an object and received by the radar apparatus 3 exceeds a predetermined threshold power, the object can be determined to be a large size vehicle.

In the above embodiments, the responsiveness in making determination of presence of a preceding vehicle is changed depending on whether a recognized front vehicle is a large size vehicle or not. However, the responsiveness may be changed depending on whether a recognized front vehicle is a small size vehicle or not.

The above explained preferred embodiments are exemplary of the invention of the present application which is described solely by the claims appended below. It should be understood that modifications of the preferred embodiments may be made as would occur to one of skill in the art.

What is claimed is:

1. A cruise control apparatus comprising:
   a headway control unit that determines whether or not at least one recognized front vehicle running ahead of an own vehicle is a preceding vehicle present in an own-vehicle lane in which the own vehicle is running by transmitting and receiving a frequency-modulated radar wave, and if the recognized front vehicle is determined to be the preceding vehicle, performs a headway control to cause the own vehicle to run following the preceding vehicle; and
   a vehicle type recognizing unit that recognizes a vehicle type of the recognized front vehicle including whether the vehicle type is a first type or a second type, the first type has a first rear width that is greater than a second rear width of the second type; wherein
   the headway control unit changes a way to perform the headway control based on the vehicle type of the recognized front vehicle,
   the headway control unit calculates an own-lane probability that the recognized front vehicle is present in the own-vehicle lane based on a position of the recognized front vehicle, performs a filtering operation on the own-lane probability to generate a filtered own-lane probability, the filtered own-lane probability has a temporal variation which is reduced compared to a temporal variation of the own-lane probability calculated, the headway control unit determining whether or not the recognized front vehicle is the preceding vehicle using the filtered own-lane probability,
   the vehicle type recognizing unit determines whether or not the recognized front vehicle is of the first type or the second type based on whether the vehicle has a shape corresponding to one of a plurality of model patterns stored in a memory unit in advance,
   when the vehicle type is the first type, the filtered own-lane probability is: a previously filtered own-lane probability added to a difference between the previously filtered own-lane probability and the calculated own-lane probability, the sum of which is multiplied by a first temporal variation to lower by a first degree of responsiveness the determination of whether or not the recognized front vehicle is the preceding vehicle, and
   when the vehicle type is the second type, the filtered own-lane probability is: the previously filtered own-lane probability added to the difference between the previously filtered own-lane probability and the calculated own-lane probability, the sum of which is multiplied by a second temporal variation that is less than the first temporal variation to lower by a second degree of responsiveness the determination of whether or not the recognized front vehicle is the preceding vehicle, the second degree of responsiveness is less than the first degree of responsiveness.

2. A cruise control apparatus comprising:
   a headway control unit that determines whether or not at least one recognized front vehicle running ahead of an own vehicle is a preceding vehicle present in an own-vehicle lane in which the own vehicle is running by transmitting and receiving a frequency-modulated radar wave, and if the recognized front vehicle is determined to be the preceding vehicle, performs a headway control to cause the own vehicle to run following the preceding vehicle; and
   a vehicle type recognizing unit that recognizes a vehicle type of the recognized front vehicle including whether the vehicle type is a first type or a second type, the first type has a first rear width that is greater than a second rear width of the second type; wherein
   the headway control unit changes a way to perform the headway control based on the vehicle type of the recognized front vehicle,
   the headway control unit performs a filtering operation on a detected front vehicle lateral position as a lateral position of the recognized front vehicle along a width direction of the own vehicle to generate a filtered front vehicle lateral position, the filtered front vehicle lateral position has a temporal variation which is smaller than a temporal variation of the detected front vehicle lateral position, the headway control unit determining whether or not the recognized front vehicle is the preceding vehicle using the filtered front vehicle lateral position,
   the vehicle type recognizing unit determines whether or not the recognized front vehicle is of the first type or the second type based on whether the vehicle has a shape corresponding to one of a plurality of model patterns stored in a memory unit in advance,
   when the vehicle type is the first type, the filtered front vehicle lateral position is: a previously filtered front vehicle lateral position added to a difference between the previously filtered front vehicle lateral position and the calculated front vehicle lateral position, the sum of which is multiplied by a first temporal variation to lower by a first degree of responsiveness the determination of whether or not the recognized front vehicle is the preceding vehicle, and
   when the vehicle type is the second type, the filtered front vehicle lateral position is: the previously filtered front vehicle lateral position added to the difference between the previously filtered front vehicle lateral position and the calculated front vehicle lateral position, the sum of which is multiplied by a second temporal variation that is less than the first temporal variation to lower by a second degree of responsiveness.

* * * * *